(12) United States Patent
Kovacs

(10) Patent No.: US 6,263,213 B1
(45) Date of Patent: Jul. 17, 2001

(54) COMPONENT-BASED CONTROL STRUCTURE FOR WIRELESS COMMUNICATION

(75) Inventor: Ernö Kovacs, Stuttgart (DE)

(73) Assignee: Sony International (Europe) GmbH, Koln-Ossendorf (DE)

( * ) Notice: Subject to any disclaimer, the term of this patent is extended or adjusted under 35 U.S.C. 154(b) by 0 days.

(21) Appl. No.: 09/217,674

(22) Filed: Dec. 21, 1998

(30) Foreign Application Priority Data

Dec. 23, 1997 (EP) .................................................. 97122844

(51) Int. Cl.$^7$ ...................................................... H04B 1/38
(52) U.S. Cl. ............................................ 455/550; 556/575
(58) Field of Search ................................... 455/422, 426, 455/423, 424, 445, 450, 452, 458, 560, 561, 550, 556, 557, 558, 575

(56) References Cited

U.S. PATENT DOCUMENTS 6,134,454 * 10/2000 Foladare et al. ...................... 455/556
6,192,259 * 2/2001 Hayashi ................................ 455/556

FOREIGN PATENT DOCUMENTS

WO 95/02217    1/1995   (WO) .

OTHER PUBLICATIONS

Katsumi Maruyama: "Object–Oriented Switching Software Technology" IEICE Transactions on Communication, vol. E75–B, No. 10, Oct. 1, 1992, pp. 957–968, XP000324829.

Kentaro Shimizu Et Al: "Hierarchical Objects Groups in Distributed Operating Systems" Jun. 13, 1988, International Conference on Distributed Computing Systems, San Jose, Jun. 13–17, 1988, pp. 18–24, Institute of Electrical and Electronics Engineers XP000092920.

Arnold E C Et Al: "Object Oriented Switching System Architectures and Software Development Processes" Proceedings of the National Communications Forum, vol. 44, Oct. 8, 1990, pp. 795–802, XP000225068.

* cited by examiner

Primary Examiner—Thanh Cong Le
(74) Attorney, Agent, or Firm—Frommer Lawrence & Haug, LLP.; William S. Frommer; Dexter T. Chang

(57) ABSTRACT

A component-based control application structure for the dynamic configuration, adaptation and extension of applications in wireless communication is presented. Thereby, a control application (304) for technical elements (301) of a mobile communications device (101a, 101b) is structured in components of a predetermined configuration (305), wherein the configuration (305) depends on the task to be performed. Each component (401) is provided with its own thread (404). Each component (401) is furthermore provided with a method interface (403) comprising different commands for the control of the operation of the respective component (401). The configuration (305) of the control application (304) can be changed dynamically (203) depending on the current task to be performed by the device.

14 Claims, 2 Drawing Sheets

COMPONENT-BASED CONTROL STRUCTURE FOR WIRELESS COMMUNICATION

BACKGROUND OF THE INVENTION

1. Field of the Invention

The present invention generally relates to the field of mobile computing systems and particularly to the control application of the soft and hardware components building the system.

2. Description of the Related Art

Mobile computing systems are made up of a number of mobile devices (MD) which might be connected to a network through different means of communication like wired or wireless networks. Mobile devices might be specialized devices like a mobile telephone or a small computing device with limited capabilities like a notebook. The mobile devices are supported through specialized applications which perform dedicated tasks on behalf of and in conjunction with the mobile device.

The method for controlling the operation of the mobile devices, i.e. the control application, must satisfy severe conditions with respect to dynamic configuration, adaptation and flexibility. These conditions and requirements origin from several sources. The power management for the used small devices requires the observation of the battery power and the flexible adaptation of all system components. The small set of available system resources (like storage space, main memory, processing power and communication bandwidth) require the dynamic configuration and adaptation of the running software and control. The interaction with the mobile environment and the user requires several parallel and independent threads of execution which enhances the complexity of configuration, adaptation and management of said components. Therefore, a way to control the mobile device and its operation in an efficient way is desirable.

Since the invention of the programming language SIMULA in 1967 object-oriented programming has been used to build flexible and modular applications. In object-oriented programming a program is built out of small objects which offer a set of methods to the other object which can be invoked. This set of methods is called the interface of the object. The interface of the object comprises all commands to control the object. Since the mid-eighties the object-oriented approach was extended to component-based programming. In component-based programming programs are assembled from small independent software components. An example for such a component-based programming is e.g. Microsoft OLE, OpenDoc and JAVA Beans. Usually, the software components support two different sets of interfaces: The first interface is a generic interface which supports the assembly of the components to build a running application. The second set of interfaces comprises specific interfaces which relate to the particular task to be performed by the corresponding component.

From EP-A-365 115 an object identifier generator for distributed computer systems is known. Thereby the nodes, as well as the connected devices and associated processes, data bases, and other objects, must be uniquely labeled or named such that the object can be positively identified throughout the entire distributed system.

From EP-A-483 037 an object-oriented programming system including a storage means, a data processor and an application operating on said data processor is known, wherein an object in said storage means defines a data structure, said object having at least one attribute containing data and an associated method for performing an action on said object in response to a message from said application.

OBJECT OF THE INVENTION

The problem at the base of the present invention is to provide an efficient application for the control of technical components of a mobile computing device.

The central idea to solve the above-mentioned problem is to provide a component-based control application structure with dynamic configuration capabilities.

SUMMARY OF THE INVENTION

According to the present invention, therefore a method for controlling a node of a mobile communications network is provided, wherein a control application a mobile communications device is structured in components of a predetermined configuration, wherein the predetermined configuration depends on the current task to be performed by the mobile communications device. Each component corresponds to an active object responsible for a specific operation of the mobile communications device. Each component is provided with its own execution thread. Each component is furthermore provided with a method interface comprising different commands for the control of the operation of the respective component. The predetermined configuration of the control application is changed dynamically depending on the current task to be performed by the mobile communications device.

The control application can be structured in a tree-like configuration.

A component can be provided with an identifier identifying the component and the role of the component in the configuration.

Every command to be emitted can be provided with the identifier of the target component, such that the components can connect dynamically with each other.

An emitted command can first be transmitted upwardly in the tree-like configuration to at least one level above the emitting component and then be transmitted downwards to all components in the tree-like configuration of the control application.

An emitted command can at first be transmitted upwardly in the tree-like configuration up to the root component of the tree-like configuration and then be transmitted downwards to all components and the tree-like configuration of the control application.

To start the control application, a start command can be sent to each component. The program line arguments can be forwarded as parameters to each component. A thread of execution can be assigned to at least one component. The assigned thread can be started and the components can be stopped by a stop command at the end of a life cycle.

A query command can be provided to query whether a component has been stopped or not.

A halt command can be provided to stop the execution of a thread of an assigned component.

A stopped execution of a thread of a component can be restarted by a resumed command.

A bind command can be provided to request a pointer to a specific component with a specific identifier.

The leaves of the tree-like configuration of the control application can represent the technical elements of the mobile communications device.

An abstract factory can transmit a create configuration command to a concrete factory, wherein the abstract factory contains an abstract, platform independent method and the concrete factory implements the abstract method of the abstract factory by creating the actual configuration of the control application depending on the platform used.

According to the present invention the above-mentioned controlling methods can be used to control a portable mobile device, a base station or a network server of a mobile communication network.

According to the present invention furthermore a mobile communications device is provided, which comprises control means for executing a control application as stated above.

Further features, details and advantages of the present invention will become clear from the following description of embodiments of the present invention taken in conjunction with the accompanying drawings.

DETAILED DESCRIPTION OF PREFERRED EMBODIMENTS

Figure 1:
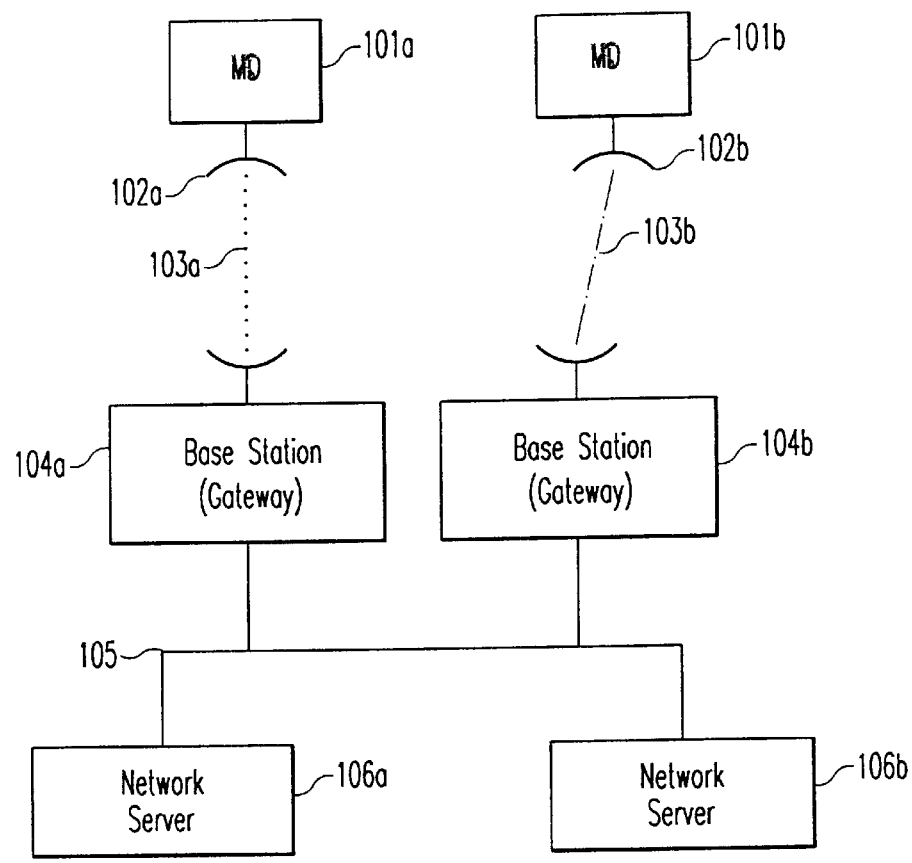
FIG. 1 schematically shows a distributed computing system including mobile devices, base stations and network servers, FIG. 2 schematically shows the principles of abstract and concrete factories and the relationship to component-based software configuration.

FIG. 1 shows a distributed computing system containing mobile devices 101a, 101b which are connected via a wireless radio interface 102a, 102b using a wireless network 103a, 103b to the base stations 104a, 104b. The base stations 104a, 104b are connected via wired networks 105 to network servers 106a, 106b which support the mobile devices MD 101a, 101b. Alternatively one or both of the networks 103a, 103b can be a wired network. Of course the base stations 104a, 104b can be connected via wireless networks to the network servers 106a, 106b.

Figure 3:
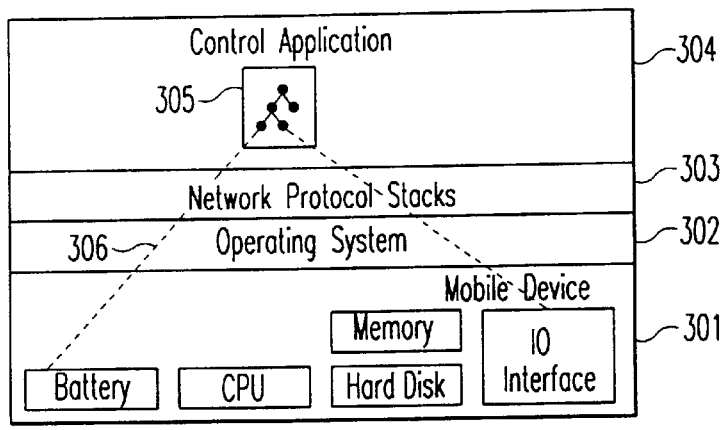
FIG. 3 shows the architecture of a mobile device.

FIG. 3 shows the architecture of a mobile device or generally of a node of the distributed system (either the mobile device, the base station/gateway or the network server) which contains as well-known the technical elements 301 like a battery, CPU, memory, hard disk or IO interfaces. The node has an operating system 302 and some network protocol stacks 303. On top of that, the control application 304 is running. The control application 304 controls the operation of the technical elements 301 as it is shown schematically through the link 306. The present invention is particularly directed on the structure and configuration of the control application 305.

According to the present invention the control application for a mobile device is built from components which support special control interfaces allowing the flexible and easy control of the components. Each component thereby corresponds to a specific operation of the mobile communications device and is designed as an active object. In order to adapt the mobile device dynamically (online) to the changing environment, e.g. low battery power, fading signal strength of the wireless communication or else, a control component of the control application is able to interrupt and halt executing components, to delete existing components or to create new components. Upon receiving the control signals exchanged, the components will shut down, halt or start the associated electronic elements 301 of the mobile device.

According to the invention each control module required to control a specific operation of the mobile device or the service in the network is represented as a component of a configuration. For example there is one control component which controls the communication between the mobile device and the servers over the wireless communication network. Another component would offer access to multimedia data over this communication channel. Still another component controls the display of the mobile communications device, etc.

As will be explained later on in detail, each component is associated with its own program execution thread, so that different components can work in parallel. Furthermore, each component is equipped with an additional control interface which allows to control the operation of the components. Through these control interfaces commands like halt, resume, or stop are given to the component. Through theses control interfaces the operation of the mobile computing device can be controlled to minimize battery and resource consumption.

As can be seen schematically in FIG. 3, to facilitate the control of a group of components at once, the components can be ordered in a tree-like structure. The tree-like structure can be used to generically forward commands from components higher in the tree to components lower in the tree. The tree can also be used to send the commands to all components contained in the tree. Furthermore, each component can be equipped with an identifier. Other components can use the identifier to search the tree, find the other component and directly interact with it. This dynamic binding facility gives the component writers the possibility to inquire about the current configuration and find the required component if it is contained in the configuration.

Another aspect of the present invention is, that object-oriented programming is used.

Object-oriented programming is computer programming packaging technique which provides reusable and easily expandable programs. In contrast with other conventional programming techniques which are not easily adaptable to new functional requirements and to new types of data, object-oriented programs are reusable and expandable as new requirements arise. In conventional programming techniques, emphasis is put on the methods to be conducted on particular data sets. However, in object-oriented programming systems, emphasis is instead placed on the real work objects which have attributes and actions to be performed on such attributes. Objects having similar characteristics and common behavior are known as instance objects of a class of objects. Therefore, instance objects contain information about things in the system while class objects contain information about instance objects. In object-oriented programming systems, messages are sent to objects. The object of a particular message simply identifies that a piece of data which comprises a specific object, i.e. the instance. In an object-oriented programming system work is accomplished by sending an action request to an object which contains or encapsulates some data.

In component-based programming the set of objects collected together and interconnected is called the configuration of the program. Depending on the configuration, the program is able to perform different tasks.

Figure 4:
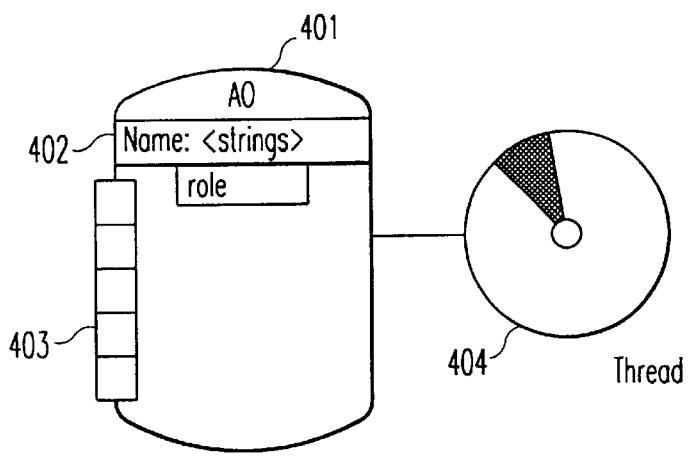
FIG. 4 shows the structure and elements of a component (active object) according to the present invention.

With reference to FIG. 4 it will now be explained how the control according to the present invention is structured and particularly how the single components of this configuration are structured. As has already been stated, according to the present invention the control is structured into a tree of components. These components are called active objects (AO). Leaf nodes are called AO-instances and non-leaf nodes are called AO-containers. Each component with the exception of the root of the tree has a parent component. An AO-container can have children components. As can be seen from FIG. 4 an AO-component 401 contains an identifier 402 comprising the name of the component 401 and the role of the component 401 within the configuration. Furthermore, the AO-component 401 comprises a method interface 403 and is associated with a thread 404. The methods offered at the method interface 403 control the operation of the thread 404.

Figure 2:
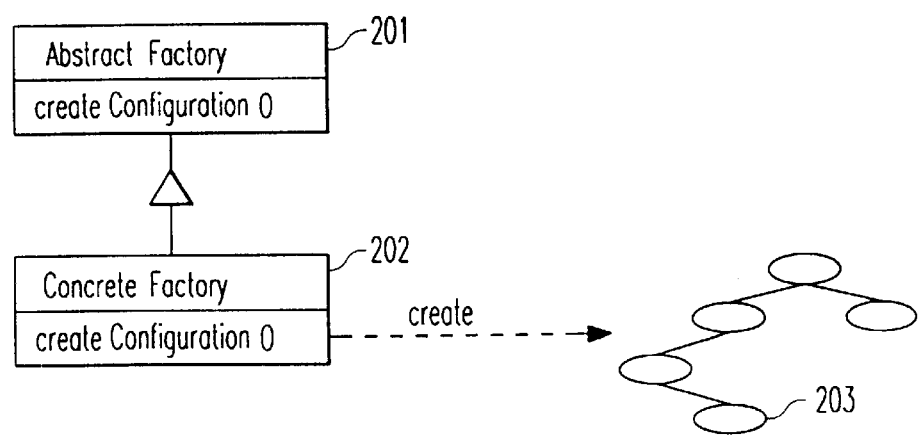

Referencing to FIG. 2 it will now be explained how, according to the present invention, a configuration of the control application can be implemented. As can be seen from FIG. 2 a class abstract factory 201 is provided which offers for example a method create configuration (). Derived from this class abstract factory 201 is a class concrete factory 202 which overloads the method create configuration (). The concrete factory 202 encapsulates the knowledge about the target configuration 203 which is created when the method create configuration () is called. The concept of an abstract factory as shown in FIG. 2 is known from Gamma et al, design patterns, Edison-Wesley, 1994. The abstract factory 201 is a design pattern which describes the possible invocation of a factory. This interface is inherited by a concrete factory 202. The concrete factory 202 contains the knowledge about which configuration 203 of the component to build. It implements the methods of the abstract factory 201 to really build the actual configuration 203 of the control system. This approach separates the configuration of the control program from the implementation of the components themselves. It is to be noted that the abstract factory 201 is platform independent. The knowledge on the particularities of the platform used for the implementation is contained in the concrete factory 202. Due to this characteristic for the control for wireless communication, the configuration of the mobile device and the network servers can be adapted easily. The configuration of the control program is therefore controlled by a factory object which is specialized for the task the device has to perform. In the case of a mobile device the factory creates only the components required to perform the current task.

It is to be noted that an abstract factory is not an independent object of its own, but a super class of the concrete factory. As the actual configuration of a device is only known to the concrete factory, there can exist different concrete factories for different devices.

As has been shown with reference to FIG. 4 each component 401 has its own unique component identifier 402. The identifier identifies the components and the role which the component plays in the given program structure. By searching the component tree for a component with a given identifier, components can bind dynamically with each other. Depending on the required configuration of the software, the factory object can be able to create components for the same role but with different behavior. For example, giving a task (called e.g. profile manager) that has to store some data. On a device with non-volatile memory, the component implementing the profile manager just stores the data in the main memory. On a note book without a non-volatile memory, the same profile manager component has to write the data to a persistent storage. Depending on the target platform, the factory object will create an appropriate profile manager object.

The control method according to the present invention can be configured dynamically by adding and removing components to and from the tree-like structure of the configuration. The factory object is able to create the required components and can reconfigure the system. When a component for a specific role is reconfigured, the factory will request all objects working with the exchanged object to rebind to the new components.

Figure 5:
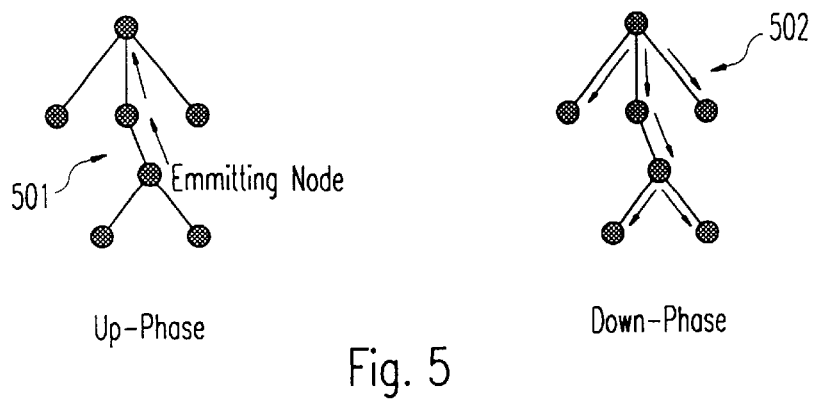
FIG. 5 shows the dissemination of a control command thrown throughout a component tree-like configuration according to the present invention.

With reference to FIG. 5 the dissemination of a control command throughout the component tree will now be explained. To summarize, in an up-phase 501 the command is propagated to the top of the tree. In the down-phase 502 the command is then transferred to all nodes. Therefore, the tree of components is used to forward the control commands along the edges of the tree. All components implement a set of predefined control commands. The set of commands may vary in the concrete usage. Basically, command forwarding and execution is supported through two operations in the interface of a component. The up-command operations forward a given command to its parent object. If an object is the root object, it then propagates the command to all its children using the command call. A single component implements its specific behavior in response to the received command. It may propagate the command to other components either before executing its own behavior or afterwards.

With this scheme it is possible to control either the complete tree up and down, or only parts (down from a specific node) of the tree. This mechanism is then used in conjunction with a special set of commands which request the dynamic behavior of the components to implement the above-stated requirements on the software. In the following an example of a set of several possible commands is presented:

START Start a component. The start of a component includes the creation and starting of its initial set of sub-components. Start does not (!) include the starting of activities.

STOP This command requests the stop of all activities of a component and will result in a subsequent stop the complete software process. In addition to that, all system resources must be released. Because components may have active threads, a component may take some time until it finally has stopped.

$HAS_{13}$ STOPPED? This asks all components whether its activities have stopped or not. This allows to wait until all components have finished their activities.

ASSIGN_THREAD This command assigns a thread to a component. This command must be executed after a START command was issued.

START_THREAD This command starts the assigned thread.

PARSE_ARGS Forwards the program line arguments to all components

HALT_ACTIONS This requires a component to halt its activities. Opposite to the stop command, this command just tells the component to halt without releasing its resources.

RESUME_ACTIONS This commands a component to restart its activities.

HAS_HALTED? This asks all components whether its activities have stopped or not.

BIND One component request a reference to a component with the given name. This enables the dynamic binding of components. This is required when the configuration of a component has changed.

REBIND This command requests that all components holding a reference to the argument component have to bind again to that component.

Through the correct application of the commands, the software process can be started, halted, reconfigured, resumed and stopped.

In the following an example of a life cycle of phases of the control will be explained. In order to have a systematic and control start-up of the application, the component tree and the command forwarding is used to signal different life cycle phases to a component.

For example, after component creation, the factory signals the beginning of the life cycle to each component through sending out the START command. After that, the command line parameters are forwarded to the components using PARSE_ARGS with the command line arguments as a parameter. After that each component is equipped with a thread through the ASSIGN_THREAD. This thread is then started in the START_THREAD phase. At the end of the life cycle, the components can be stopped using STOP. The command HAS_STOPPED queries whether an object has already stopped or not.

The BIND command requests a pointer to a specific object with a specific name. A controlling application can request rebinding of objects through the command REBIND. The command HALT stops executing threads, the command RESUME restarts them again.

According to the present invention a method to build the software for the mobile devices based on component-based, object-oriented programming is used, which components support special control interfaces along the flexible and easy control of the components. The configuration of the program can be controlled by a factory object which is specialized for the task the device has to perform. In the case of a mobile device, the factory creates only the components required to form the current task.

What is claimed is:

1. A method for controlling a mobile communications device, comprising the steps of:

structuring a control application of the mobile communications device in components of a predetermined configuration, wherein the predetermined configuration depends on a current task to be performed by the mobile communications device and each component is designed as an active object responsible for a specific operation of the mobile communications device;

providing each component with its own execution thread corresponding to the operation to be effected by the component;

providing each component with a method interface comprising different commands for the control of the operation of the respective component; and dynamically changing the configuration of the control application depending on the current task to be performed.

2. A method according to claim 1, wherein the structuring step structures the control application in a tree-like configuration.

3. A method according to claim 2, further comprising the steps of:

transmitting an emitted command upwards in the tree-like configuration to at least one level above an emitting component; and transmitting the emitted command downwards to all components in the tree-like configuration of the control application.

4. A method according to claim 2, further comprising the steps of:

transmitting an emitted command upwards in the tree-like configuration to a root component of the tree-like configuration; and transmitting the emitted command downwards to all components in the tree-like configuration of the control application.

5. A method according to claim 1, further comprising the step of providing each component with an identifier identifying the component and a role of the component in the configuration of the control application.

6. A method according to claim 5, further comprising the step of providing a command to be emitted with the identifier of a target component, so that the command is only executed by that component.

7. A method according to claim 1, further comprising the step of providing a command to be emitted to the control application or a sub-tree thereof without an identifier.

8. A method according to claim 1, further comprising the steps of:

sending a start command to each component to start the control application;

forwarding program line arguments as parameters to each component;

assigning a thread to at least one component;

starting the assigned thread; and stopping the components by a stop command.

9. A method according to claim 8, further comprising the step of providing a query command to query whether a component has been stopped or not.

10. A method according to claim 8, further comprising the step of providing a halt command to stop the execution of a thread of an assigned component.

11. A method according to claim 10, further comprising the step of providing a resume command to restart a stopped execution of a thread of a component.

12. A method according to claim 8, further comprising the step of providing a bind command to request a pointer to a specific component with a specific identifier.

13. A method according to claim 12, wherein leaves of the tree-like configuration of the control application represent technical elements of the mobile communications device.

14. A method according to claim 1, wherein an abstract factory directly transmits a create configuration command to a concrete factory, and wherein the abstract factory contains an abstract, platform independent method and the concrete factory implements the abstract method of the abstract factory by creating the actual configuration of the control application depending on the platform used.

* * * * *